United States Patent
McKenzie (10) Patent No.: US 11,522,448 B2
(45) Date of Patent: Dec. 6, 2022

(54) AUTONOMOUS CURRENT SHARING FOR POWER STAGES

(71) Applicant: Alpha and Omega Semiconductor (Cayman) Limited, Grand Cayman (KY)

(72) Inventor: Philip McKenzie, Austin, TX (US)

(73) Assignee: Alpha and Omega Semiconductor (Cayman) Limited, Grand Cayman (KY)

( * ) Notice: Subject to any disclaimer, the term of this patent is extended or adjusted under 35 U.S.C. 154(b) by 861 days.

(21) Appl. No.: 16/425,534

(22) Filed: May 29, 2019

(65) Prior Publication Data

US 2020/0381998 A1    Dec. 3, 2020

(51) Int. Cl.
    *H02M 3/156*      (2006.01)
    *G05B 15/02*      (2006.01)
    (Continued)

(52) U.S. Cl.
    CPC ............ *H02M 3/156* (2013.01); *G05B 15/02* (2013.01); *G06F 1/3287* (2013.01); *G06F 13/40* (2013.01)

(58) Field of Classification Search
    CPC ...... H02M 3/156; H02M 3/1586; H02M 1/08; H02M 3/158; H02M 1/088; G05B 15/02;
    (Continued)

(56) References Cited

U.S. PATENT DOCUMENTS

| 10,261,113 | B2 | 4/2019 | Li |
| 2008/0074911 | A1 | 3/2008 | Petter |

(Continued)

FOREIGN PATENT DOCUMENTS

| CN | 105337493 A | 2/2016 |
| CN | 105576644 B | 11/2018 |
| EP | 1122973 B1 | 12/2005 |

OTHER PUBLICATIONS

Renesas, ISL8200AM Complete Current Share 10A DC/DC Power Module, Data Sheet, Apr. 27, 2018, [retrieved on Mar. 11, 2019], 25 pages, US. Retrieved from the Internet <https://www.renesas.com/us/en/products/space-harsh-environment/harsh-environment/analog-power-modules/device/ISL8200AM.html>.

(Continued)

*Primary Examiner* — Michael J Brown
(74) *Attorney, Agent, or Firm* — Craige Thompson; Thompson Patent Law; Timothy D. Snowden (57) ABSTRACT

Apparatus and associated methods relate to modulating a duty cycle in each of N interleaved power stages in response to determination whether a phase current is above or below an average of all phase output currents. In an illustrative example, the duty cycle modulation may increase or decrease delay on either the leading or trailing edges, which may fine-tune the phase PWM signal to correct the phase current to the average phase current. The modulation may be determined by comparing, for example, the voltage polarity across a resistor that extends between a signal representative of average phase current (IMON/N) and the corresponding phase current. By using the delay modulation engine, a power stage may locally and autonomously change the pulse width of a PWM signal to substantially balance phase currents among all of the interleaved power stages.

22 Claims, 6 Drawing Sheets

(51) Int. Cl.
  *G06F 13/40* (2006.01)
  *G06F 1/3287* (2019.01)
  *G06F 1/32* (2019.01)

(58) Field of Classification Search
  CPC .......... G06F 1/3287; G06F 13/40; G06F 1/26;
  Y02D 10/00
  USPC ................................ 713/300, 310, 320, 330
  See application file for complete search history.

(56) References Cited

U.S. PATENT DOCUMENTS

| | | |
|---|---|---|
| 2013/0009556 A1 | 1/2013 | Szczeszynski et al. |
| 2013/0049712 A1* | 2/2013 | Ueno .................. H02M 3/1584 323/234 |
| 2015/0365002 A1 | 12/2015 | Cao et al. |
| 2018/0183332 A1* | 6/2018 | Herzer .................. H02M 3/158 |
| 2018/0262112 A1 | 9/2018 | Saito et al. |
| 2018/0364784 A1 | 12/2018 | Luo et al. |

OTHER PUBLICATIONS

Renesas, ISL68301 Scalable Single Output Digital PWM Controller with PMBus, Data Sheet, Jun. 7, 2018, [retrieved an Mar. 11, 2019], 121 pages, US. Retrieved from the Internet <https://www.renesas.com/us/en/products/power-management/digital-power/digital-pwm-controllers/device/ISL68301.html>.

Renesas, ISL99227, ISL99227B Smart Power Stage (SPS) Module with Integrated High Accuracy Current and Temperature Monitors, Data Sheet, Oct. 2, 2017, [retrieved on Mar. 11, 2019], 17 pages, US. Retrieved from the Internet <https://www.renesas.com/us/en/products/power-management/computing-power-vrm-imvp/smart-power-stage/device/ISL99227B.html>.

Texas Instruments, Synchronous 8-Bit Up/Down Counters, Data Sheet, Jan. 1995, [retrieved on Mar. 21, 2019], 21 pages, US. Retrieved from the Internet <http://www.ti.com/lit/ds/symlink/sn54as867.pdf>.

Republic of China, Office Action, Intellectual Property Bureau of the Ministry, dated Oct. 26, 2020.

* cited by examiner

AUTONOMOUS CURRENT SHARING FOR POWER STAGES

TECHNICAL FIELD

Various embodiments relate generally to power stages.

BACKGROUND

Electronic devices, which may also be referred to as loads, receive power from a variety of electrical power sources. For example, some power sources may couple to a load device at a wall outlet (e.g., from a mains source) or may couple more directly to various local and/or portable sources (e.g., batteries, renewable energy sources, generators). Some load devices, such as central processing units (CPUs) and graphics processors (GPUs) continue to develop higher input current requirements while demanding tight voltage regulation and/or high efficiency from the power source.

In some electronic devices, the source voltage supply (e.g., battery input, rectified mains supply, intermediate DC supply) may be converted to a load compatible voltage by various voltage conversion circuits. Switch-mode power supplies have gained popularity as voltage conversion circuits due to their high efficiency and therefore are often used to supply a variety of electronic loads.

Switch-mode power supplies convert voltages using switching devices that turn on with very low resistance and turn off with very high resistance. Switch-mode power supplies may charge an output inductor during a period of time and may release part or all of the inductor energy during a subsequent period of time. The output energy may be delivered to a bank of output capacitors, which provide the filtering to produce a DC output voltage. In buck-derived switch-mode power supplies, the output voltage, in a steady state, may be approximately the input voltage times a duty cycle, where the duty cycle is the duration of the on-time of a pass switch divided by the total on-time and off-time of the pass switch for one switching cycle.

SUMMARY

Apparatus and associated methods relate to modulating a duty cycle in each of N interleaved power stages in response to determination whether a phase current is above or below an average of all phase output currents. In an illustrative example, the duty cycle modulation may increase or decrease delay on either the leading or trailing edges, which may fine-tune the phase PWM signal to correct the phase current to the average phase current. The modulation may be determined by comparing, for example, the voltage polarity across a resistor that extends between a signal representative of average phase current (IMON/N) and the corresponding phase current. By using the delay modulation engine, a power stage may locally and autonomously change the pulse width of a PWM signal to substantially balance phase currents among all of the interleaved power stages.

Various embodiments may achieve one or more advantages. For example, a PWM controller may use a current sense signal from each of N interleaved phases (e.g., power stages) to alter a PWM signal to each stage in order to balance output currents supplied from each phase. In various embodiments, a power stage in each phase may be able to self-adjust its own output current to match an average current supplied by the other N-1 interleaved phases to achieve current balancing between phases. Such current balancing may be advantageously accomplished independently by each power stage without, for example, the direct intervention of the PWM controller. The total output current of an arbitrary number of interleaved phases in a multi-phase power supply may be reported to the PWM controller. In some implementations, a circuit suitable to balance the current may be backwards pin compatible with some existing power stage architectures. Current sharing may be achieved in each stage, for example, by comparing the stage average current to a composite average current that sums current from all stages. Based on the comparison, duty cycle adjustments may be made in each respective power stage control circuit to cause the corresponding average stage current to substantially regulate based on the average composite current.

In some embodiments, each power stage integrated circuit (IC) may employ the same average output current pin (e.g., IMON) to feed back a stage current signal to, for example, a common PWM controller. Thus, the PWM controller may use one pin to receive a feedback signal representative of all interleaved phase output currents from a number of power stages. In some implementations that use a delay modulation engine, the PWM controller may advantageously be designed to have reduced pin count. Therefore, the package size of the PWM controller may be decreased. In some embodiments, as each power stage may be able to adjust its own current to achieve current balancing among phases without the intervention of the PWM controller, the design and operation of the PWM controller may advantageously be simplified. In some embodiments, a new smart power stage (SPS) having an embodiment of a delay modulation engine may be able to be used in, for example, multi-phase applications. In some embodiments, the total number of PWM controllers used in digital or analog current sharing schemes may be advantageously reduced. Some embodiments may also include one or more phase doublers or phase multipliers to provide more PWM signals. Output current signals of power stages may be received by the phase doublers or phase multipliers. By using the power stage having a delay modulation engine, the pin numbers, and thus, the packaging size of a phase doubler or a phase multiplier may advantageously be reduced.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, a power converter having exemplary smart power stages (SPSs) is briefly introduced with reference to FIG. 1. Second, with reference to FIGS. 2-4B, the discussion turns to exemplary embodiments that illustrate the architecture of the smart power stage. Finally, with reference to FIG. 5, further explanatory discussion is presented to explain the method to adjust duty cycles of an incoming PWM signal.

DC-to-DC voltage conversion is often performed by Switching Voltage regulators, or step-down regulators, also referred to as voltage converters or point-of-load (POL) regulators/converters, converting a higher Voltage (e.g., 12V) to a lower value as required by one or more load devices. More generally, voltage regulators and current regulators are commonly referred to as power converters, and as used herein, the term power converter is meant to encompass all such devices.

Figure 1:
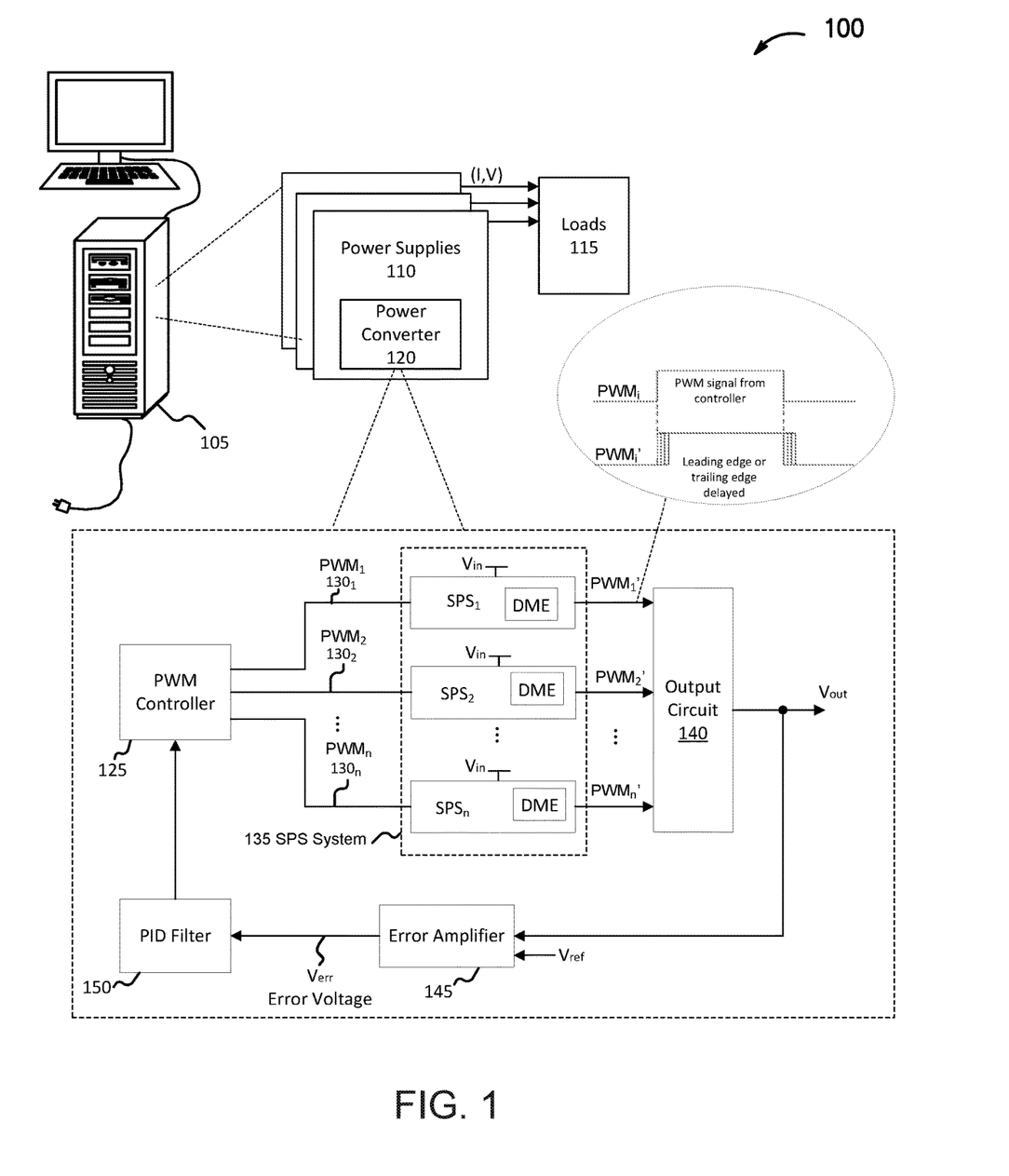
FIG. 1 depicts a power converter implemented with an exemplary smart power stage (SPS) system.

FIG. 1 depicts a power converter implemented with an exemplary smart power stage system. In this depicted example, system 100 includes a powered load system 105. The powered load system 105 includes one or more interleaved power supplies 110 implemented in the computer 105 supplying one or more loads 115. In some examples, the loads 115 may be specified to operate at an input voltage with limited voltage perturbations. The power supplies 110 include a power converter 120. The power converter 120 regulates currents or voltages supplied into the loads 115. The power converter 120 is configured to dynamically modulate the frequency of a switch signal to achieve a fast transient response. More specifically, the power converter 120 includes a pulse width modulator (PWM) controller 125 controlling the input to associated power switches, which may support, for example, reducing output capacitance. In an illustrative example, the PWM controller 125 generates one or more pulse width modulation (PWM) signals (e.g., $PWM_1$ signal $130_1$, $PWM_2$ signal $130_2$, . . . , $PWM_n$ signal $130_n$) with commanded duty cycle at the frequency of $f_{sw}$. The power converter 120 also includes a smart power stage (SPS) system 135. The SPS system 135 includes N smart power stages. Each power stage (e.g., $SPS_1$, $SPS_2$, . . . , $SPS_n$) of the N power stages 135 receives one of the generated PWM signals (e.g., $130_1$, $130_2$, . . . , $130_n$), each of the PWM signals may have an interleaved phase (e.g., delay) corresponding to its respective SPS. Each power stage may deliver a stage power output signal ($PWM_1'$, $PWM_2'$, . . . , $PWM_N'$) in order to create a substantially balanced share of the power to the load by supplying a controlled stage output current ($Iout_1$, $Iout_2$, $Iout_3$, $Iout_4$) via an output circuit 140. In various embodiments, the output circuit 140 may include one or more inductive elements (e.g., via an inductor couple in series between the output of the $SPS_i$ and the common load node), which may include coupled or uncoupled windings, for example, between stages. The connections between the SPS system 135 and the PWM controller 125 are described in further detail with reference to FIG. 2. Each SPS in the SPS system 135 includes a delay modulation engine (DME). The DME may receive a corresponding PWM signal (e.g., $PWM_i$) from the PWM controller 125 and adjust the pulse width of the corresponding $PWM_i$ signal to generate the stage power output signal $PWM_i'$ that is adapted to substantially maintain or regulate balance among the phase currents in each of the stages. In various embodiments, the DME in each stage may adjust the corresponding duty cycle in response to, for example, a comparison of the corresponding stage current to a signal indicative of an average current for all stages. An exemplary architecture of the DME is discussed in further detail with reference to FIG. 3B.

In some embodiments, each power stage of the SPS system 135 may include one or more switching devices, which in some implementations may be referred to as power transistors. The power converter 120 may switch a pair of power transistors to produce a rectangular-wave at the transistors' common node SW. The produced rectangular-wave may be smoothed out using the output circuit 140 to produce a desired unipolar (e.g., DC) output voltage $V_{out}$. In some examples, an SPS may refer to a power stage having integrated high accuracy current and temperature monitors that can be fed back to the PWM controller 125 and/or phase doubler to complete a multiphase DC-DC system. In some embodiments, the PWM controller 125 may have N PWM pins to output the N PWM signals. To complete a DC-DC system, the PWM controller 125 may also receive a composite of stage current monitor output signals (e.g., $IMON_1$, $IMON_2$, $IMON_3$, $IMON_4$) to adjust a duty cycle of the PWM signals that the PWM controller 125 supplies to each stage. The PWM controller may, in response to the current monitor output signals, adjust the duty cycle of the stage power output signals $PWM_i'$ in order, for example, to adjust a voltage level for $V_{out}$. In addition, each of the SPS circuits may, in response to the current monitor output signals, operate to adjust the duty cycle for that corresponding SPS in order to substantially regulate the current supplied from that phase according to the composite of the stage current monitor signals. An exemplary architecture of an SPS is described in further detail with reference to FIG. 3A.

The power converter 120 also includes an error amplifier 145. The error amplifier 145 receives the output voltage signal $V_{out}$ and a reference voltage signal $V_{ref}$ to generate an error signal $V_{err}$. In the depicted example, the error signal may be received by a proportional-integral-derivative (PID)) filter 150. The PID filter 150, the PWM controller 125, and the SPS system 135 may be configured as a feedback loop operable to control the duty cycle so as to regulate the output voltage $V_{out}$.

Figure 2:
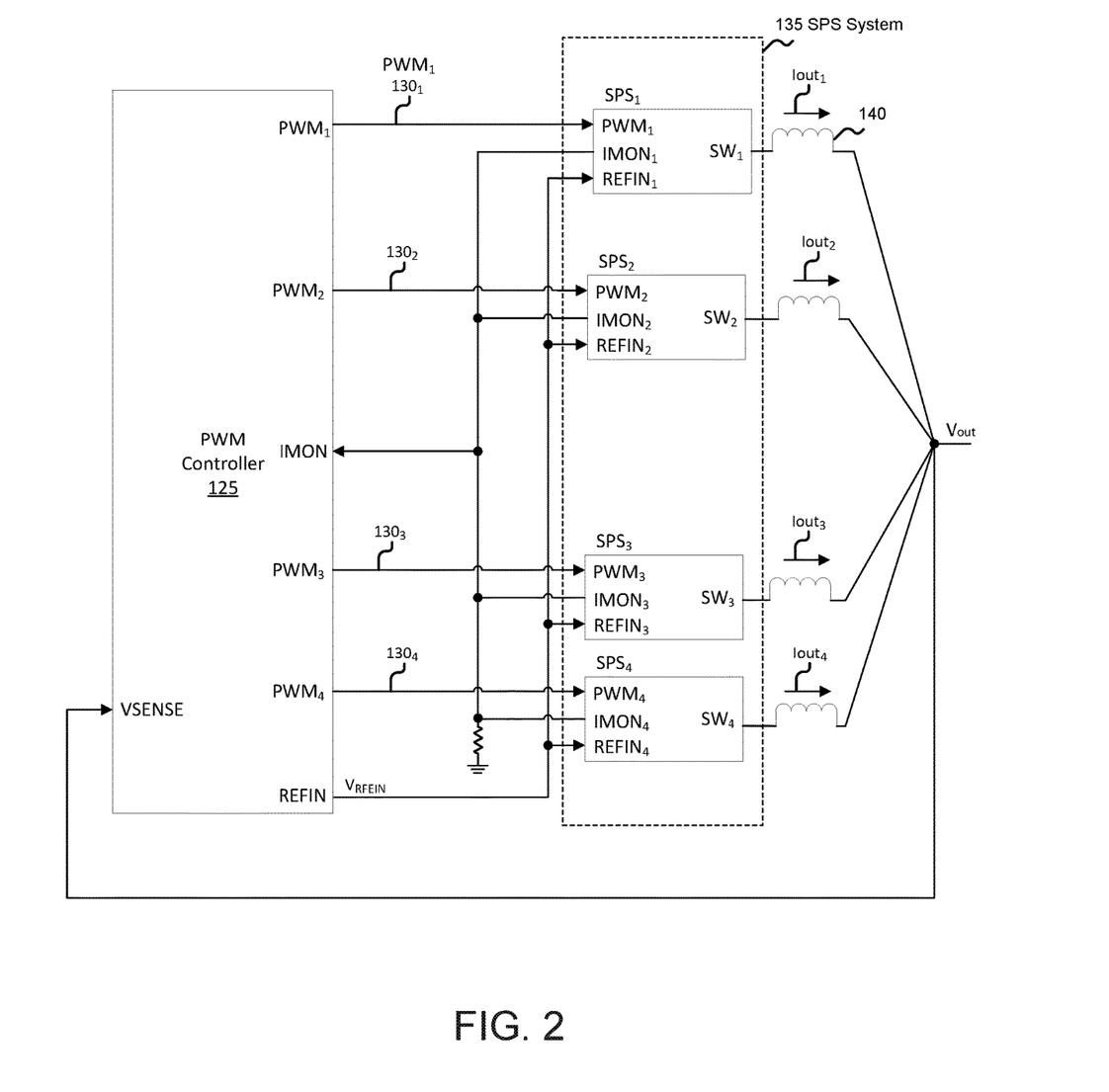
FIG. 2 depicts connections between the exemplary SPS system and a PWM controller in the power converter.

FIG. 2 depicts connections between the exemplary SPS system and a PWM controller in the power converter. In this depicted example, a PWM controller (e.g., the PWM controller 125) generates four PWM signals (e.g., $PWM_1$, $PWM_2$, $PWM_3$, and $PWM_4$). Each smart power stage (e.g., $SPS_1$, $SPS_2$, $SPS_3$, or, $SPS_4$) in the SPS system 135 receives a corresponding PWM signal (e.g., $PWM_1$, $PWM_2$, $PWM_3$, $PWM_4$) and generates a corresponding current monitor output signal (e.g., $IMON_1$, $IMON_2$, $IMON_3$, $IMON_4$) referenced to a reference voltage $V_{REFIN}$. The reference voltage $V_{REFIN}$ may be a direct voltage supplied by an external source. In this depicted example, the reference voltage $V_{REFIN}$ is supplied by the PWM controller 125.

In this depicted example, each current monitor output signal (e.g., $IMON_1$, $IMON_2$, $IMON_3$, $IMON_4$) generated by each smart power stage may substantially represent a function (e.g., an average) current monitor output signal, and a total current monitor output (IMON) of the SPS system 135 is reported to the PWM controller 125. The total current monitor output (IMON) is a combination of IMON output signals from each of the SPSs in the SPS system 135. By generating the average current monitor output signals, the PWM controller 125 may employ only one pin to receive the total output current signal, rather than having N pin numbers to separately receive N current monitor output signals (e.g., $IMON_1$, $IMON_2$, $IMON_3$, $IMON_4$). Each SPS may modulate the duty cycle of a corresponding PWM signal to generate the average current monitor output signal (e.g., $IMON_1$, $IMON_2$, $IMON_3$, $IMON_4$). An exemplary architecture of a delay modulation engine (DME) used to modulate the duty cycle of the PWM signal received from the PWM controller 125 is described in further detail with reference to FIG. 3B.

Figure 3A:
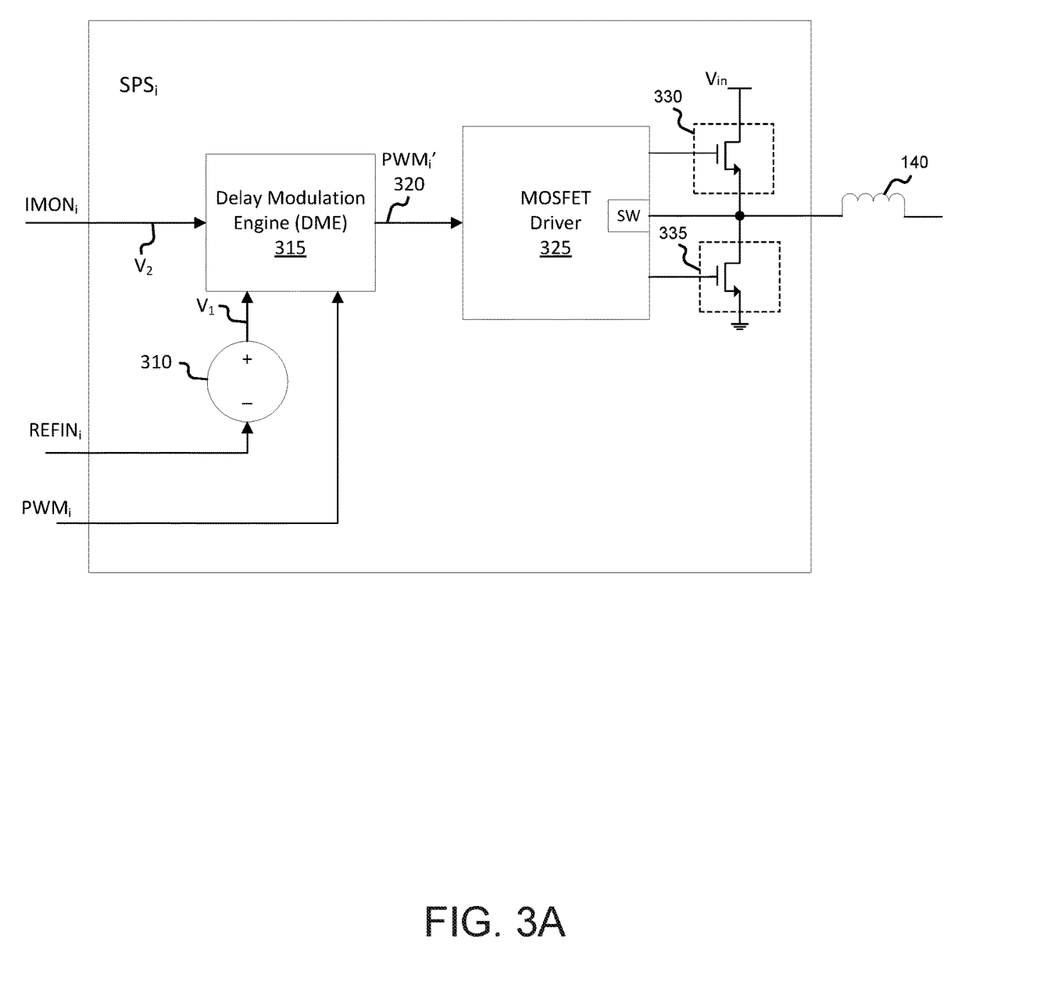
FIG. 3A depicts an architecture of an exemplary SPS in the SPS system.

FIG. 3A depicts an architecture of an exemplary SPS in the SPS system. In this depicted example, an $SPS_i$ (e.g., $SPS_1$, $SPS_2$, ..., $SPS_n$) includes a voltage source 310. The negative terminal of the voltage source 310 is connected to a reference voltage (e.g., $V_{REFIN}$) provided by an external source (e.g., from the PWM controller 125 or a power rail) through a $REFIN_i$ pin of the $SPS_i$. The $SPS_i$ also generates a current monitor output signal (e.g., $IMON_i$). The $IMON_i$ is part of the total output (e.g., IMON) that is returned to the PWM controller 125. The $IMON_i$ contains the $SPS_i$ MOSFET load current information that may be used for load telemetry and control. The $IMON_i$ output from the $SPS_i$ may be referenced to the reference voltage (e.g., $V_{REFIN}$) of the delay modulation engine 315, instead of ground. The positive terminal of the voltage source 310 is connected to a delay modulation engine (DME) 315. In some embodiments, the voltage source 310 may be a signal generated by an $SPS_i$ that represents a scaled version of the output current $Iout_i$ (e.g., the current through inductor 140). The delay modulation engine 315 generates a duty cycle (e.g., pulse width) adjusted PWM signal 320 (e.g., $PWM_i'$) in response to a received PWM signal (e.g., $PWM_i$ generated by the PWM controller 125), the IMON signal $IMON_i$ and the and the reference voltage $V_{REFIN}$. Thus, $PWM_i$ is adjusted inside the $SPS_i$, rather than in the PWM controller 125.

The duty cycle adjusted PWM signal $PWM_i'$ 320 is received by, for example, a metal-oxide-semiconductor field-effect-transistor (MOSFET) driver 325. The MOSFET driver 325 switches a high side switch (e.g., transistor) 330 and a low side switch (e.g., transistor) 335 to create a regulated voltage across an inductor in the output circuit 140, for example. By using the delay modulation engine (DME), pulse width of a PWM signal may be locally and autonomously adjusted within each SPS to achieve substantially evenly distributed current sharing among all active phases of an SPS system.

Figure 3B:
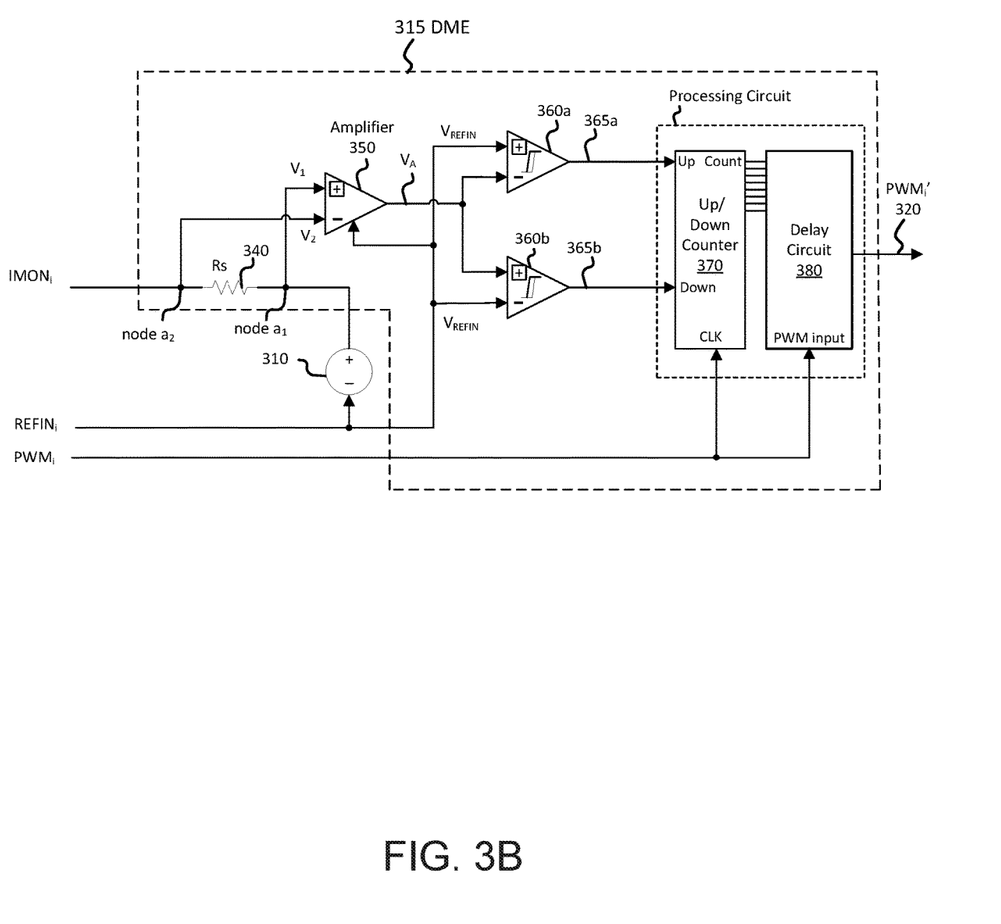
FIG. 3B depicts an architecture of an exemplary delay modulation engine (DME) of the SPS.

FIG. 3B depicts an architecture of an exemplary delay modulation engine (DME) of the SPS. In various embodiments, the delay modulation engine may be configured to add or remove delay to the leading or trailing edges of the PWM signal from the PWM controller 125 in order to regulate the corresponding stage current to substantially match, for example, an average value of the output current (e.g., IMON/N). By causing each of the stages to autonomously and substantially track an average current across all phases, the overall system may advantageously maintain substantially balanced currents such that, for example, power dissipation, current, and/or voltage stresses may be substantially minimized, which may result in improved service life, and/or reduced ripple voltage in some examples. In this depicted example, the delay modulation engine 315 includes a resistor ($R_s$) 340. The resistor 340 has a first node $a_1$ and a second node $a_2$. The first node $a_1$ is coupled to the positive terminal of the voltage source 310 to receive a first voltage $V_1$. The second node $a_2$ is coupled to receive a voltage $V_2$ of the IMON signal ($IMON_i$), which is coupled to a circuit configured to generate the corresponding $SPS_i$, which node is also coupled to a common bus (IMON) that may, for example, be configured to sum the IMON signals from each of the SPS stages. The voltage $V_1$ at the first node $a_1$ and the voltage $V_2$ at the second node $a_2$ are received by an amplifier 350. In this depicted example, amplifier 350 is a differential amplifier that amplifies the voltage difference between $V_1$ and $V_2$. The reverence voltage $V_{REFIN}$ establishes the amplifier output voltage when $V_1$ equals $V_2$.

The delay modulation engine 315 also includes a first comparator 360a. The first comparator 360a generates a first difference signal 365a indicating the difference between the reference voltage $V_{REFIN}$ and the amplified voltage (e.g., $V_A$). The first comparator 360a may be configured to have a first predetermined dead zone. When the difference between the reference voltage $V_{REFIN}$ and the amplified voltage (e.g., $V_A$) is positive and exceeds the first predetermined dead zone, the first control signal 365a may imply that the current of $SPS_i$ is above an average current (e.g., $IMON_i$>IMON/N).

The delay modulation engine 315 also includes a second comparator 360b. The second comparator 360d generates a second difference signal 365b indicating the difference between the amplified voltage (e.g., $V_A$) and the reference voltage $V_{REFIN}$. The second comparator 360b may be configured to have a second predetermined dead zone. When the difference between the amplified voltage (e.g., $V_A$) and the reference voltage $V_{REFIN}$ is positive and exceeds the second predetermined dead zone, the second comparator 360b may generate a second control signal (a second comparison result) 365b. The second control signal 365b may imply that the current of $SPS_i$ is below the average current (e.g., $IMON_i$<IMON/N). In some embodiments, the range of the first predetermined dead zone may be equal to the range of the second predetermined dead zone.

The delay modulation engine 315 in the depicted embodiment also includes an up/down counter 370. The up input of the up/down counter 370 is controlled by the first control signal 365a and the down input of the up/down counter 370 is controlled by the second control signal 365b. The corresponding PWM signal $PWM_i$ is received by the up/down counter 370 and used as a clock signal of the up/down counter 270. When the first control signal 365a is high, the up/down counter 370 may increase its count each time the $PWM_i$ is received. When the second control signal 365b is high, the up/down counter 370 may decrease its count each time the $PWM_i$ is received.

The output of the up/down counter 370 is received by a delay circuit 380. The delay circuit 380 delays the leading edge or the trailing edge of $PWM_1$ to adjust the pulse width of $PWM_1$ in response to the output of the up/down counter 370 and $PWM_1$. More specifically, when difference between the reference voltage $V_{REFIN}$ and the amplified voltage $V_A$ is larger than the first dead zone value, which means the $SPS_i$ may have too much current. Thus, the delay circuit 380 may delay the leading edge of $PWM_i$. Thus, the pulse width of $PWM_i$ may be shortened to source less current. When the difference is less than or equals to the first dead zone value, $V_A$ may be regarded as roughly equals $V_{REFIN}$, and the delay circuit 380 may not change the leading edge of $PWM_i$.

When the difference between the amplified voltage $V_A$ and the reference voltage $V_{REFIN}$ is larger than the second dead zone value, which means the SPSi may have too little current. The delay circuit 380 may delay the trailing edge of $PWM_i$ to increase the pulse width of $PWM_i$ to have more current. When the difference between the amplified voltage $V_A$ and the reference voltage $V_{REFIN}$ is less than or equals to the second dead zone value, $V_A$ may be regarded as roughly equals $V_{REFIN}$, and the delay circuit 380 may not change the trailing edge of $PWM_1$. Counts above the mid-point of the counter 370 may represent the number of delay periods to be added to the trailing edge of the PWM signal $PWM_i$. Counts below the mid-point of the counter 370 may represent the number of delay periods to be added to the leading edge of the PWM signal $PWM_i$. When the count is at the mid-point, the PWM signal $PWM_i$ may not be altered. By adjusting the leading edge or the trailing edge of the PWM signal $PWM_i$, phase current $IMON_i$ may be then dynamically changed to equal to the average current (e.g., IMON/N). The counter 370 and the delay circuit 380 may be regarded as a processing circuit to introduce a predetermined delay on the PWM signal $PWM_i$ in response to the comparison results of the comparator 360a and comparator 260b.

Although in this depicted example, the delay modulation engine 315 includes the first comparator performing subtracting $V_A$ from $V_{REFIN}$, and the second comparator performing subtracting $V_{REFIN}$ from $V_A$, in some embodiments, the delay modulation engine 315 may include one comparator that either performs subtracting $V_A$ from $V_{REFIN}$, or performs subtracting $V_{REFIN}$ from $V_A$. A positive comparison result may be used to control the up input and a negative comparison result may be used to control the down input of the up/down counter 370, for example.

In some embodiments, the comparison results of the first comparator 360a and the second comparator 360b may be converted to digital signals through one or more analog-to-digital converters (ADCs). The digital signals may be used as control signals of a state machine. The state machine may be configured to adjust the duty cycle (e.g., pulse width) of $PWM_i$ in response to the digital signals. In some embodiments, voltage-controlled-delay-line (VCDL) may be used to introduce delays on the leading edge or the trailing edge of $PWM_i$, for example. In some embodiments, a variable step size may be employed, for example, as a function of the error signal amplitude at the input of the amplifier 350. The error signal at the input of the amplifier 350 may be a function of a difference (e.g., amplitude and sign) between the average stage current amplitude and the average total current amplitude (e.g., IMON).

Figure 4A:
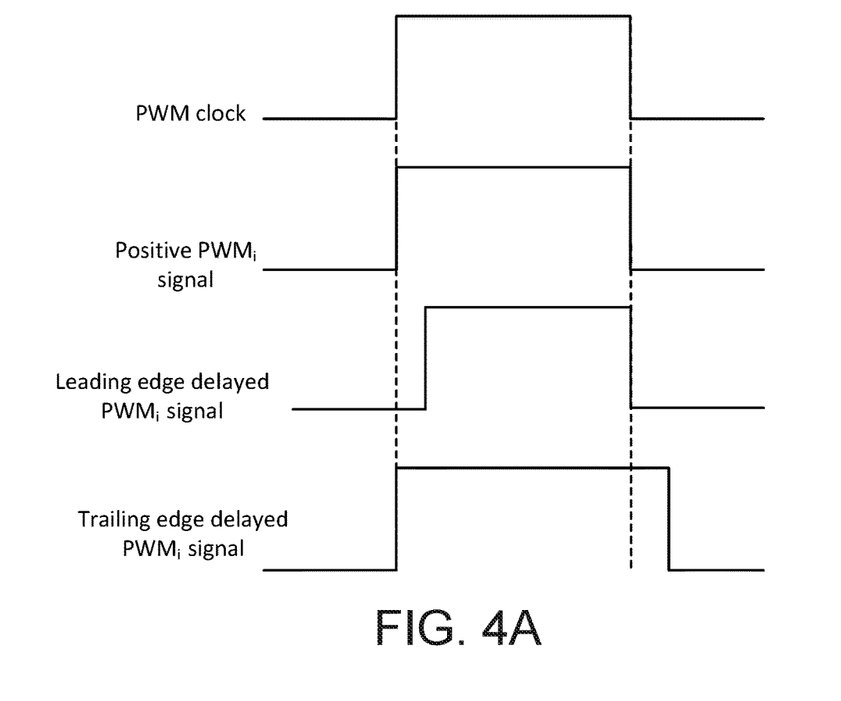
FIG. 4A depicts timing diagrams of an incoming PWM signal and exemplary duty cycle adjusted PWM signals.

FIG. 4A depicts timing diagrams of an incoming PWM signal and exemplary duty cycle adjusted PWM signals. In this depicted example, an incoming PWM signal is a positive pulse signal. As shown in FIG. 4A, pulse width (e.g., a function of duty cycle) of the incoming PWM signal (e.g., $PWM_i$) generated by a controller (e.g., the PWM controller 125) may be adjusted (e.g., by the power stage control logic 315 of $SPS_i$). The leading edge and/or the trailing edge of $PWM_i$ may be adjusted in response to the voltage difference of two electrical terminals of a resistor (e.g., resistor Rs 340). More specifically, the leading edge of $PWM_i$ may be delayed to shorten pulse width, and therefore, a phase current may be decreased. The trailing edge of $PWM_i$ may be delayed to lengthen pulse width and therefore, a phase current may be increased. Thus, phase current $IMON_i$ of each SPS in an SPS system may be dynamically adjusted.

Figure 4B:
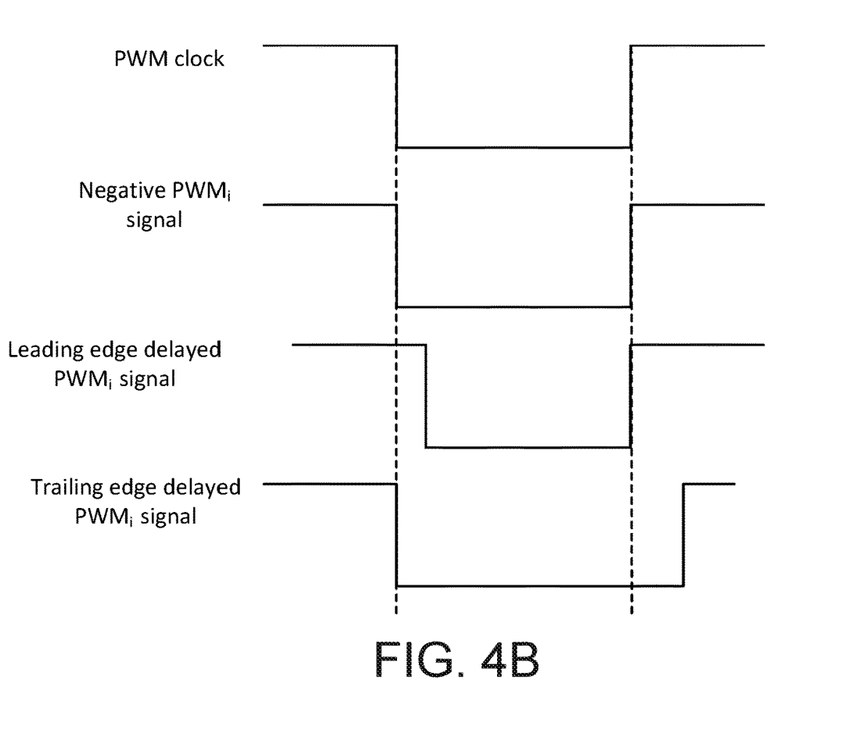
FIG. 4B depicts timing diagrams of an incoming PWM signal and exemplary duty cycle adjusted PWM signals.

FIG. 4B depicts timing diagrams of an incoming PWM signal and exemplary duty cycle adjusted PWM signals. In this depicted example, the PWM signal is a negative pulse signal. The leading edge and the trailing edge of $PWM_i$ may be adjusted in response to the voltage difference of two electrical terminals of a resistor (e.g., resistor Rs 340). More specifically, the trailing edge of $PWM_i$ may be delayed to shorten pulse width of $PWM_i$, and therefore, a phase current may be decreased. The leading edge of $PWM_i$ may be delayed to lengthen pulse width of $PWM_i$ and therefore, a phase current may be increased. Thus, phase current $IMON_i$ of each SPS may be dynamically adjusted to match the average current (e.g., IMON/N).

Figure 5:
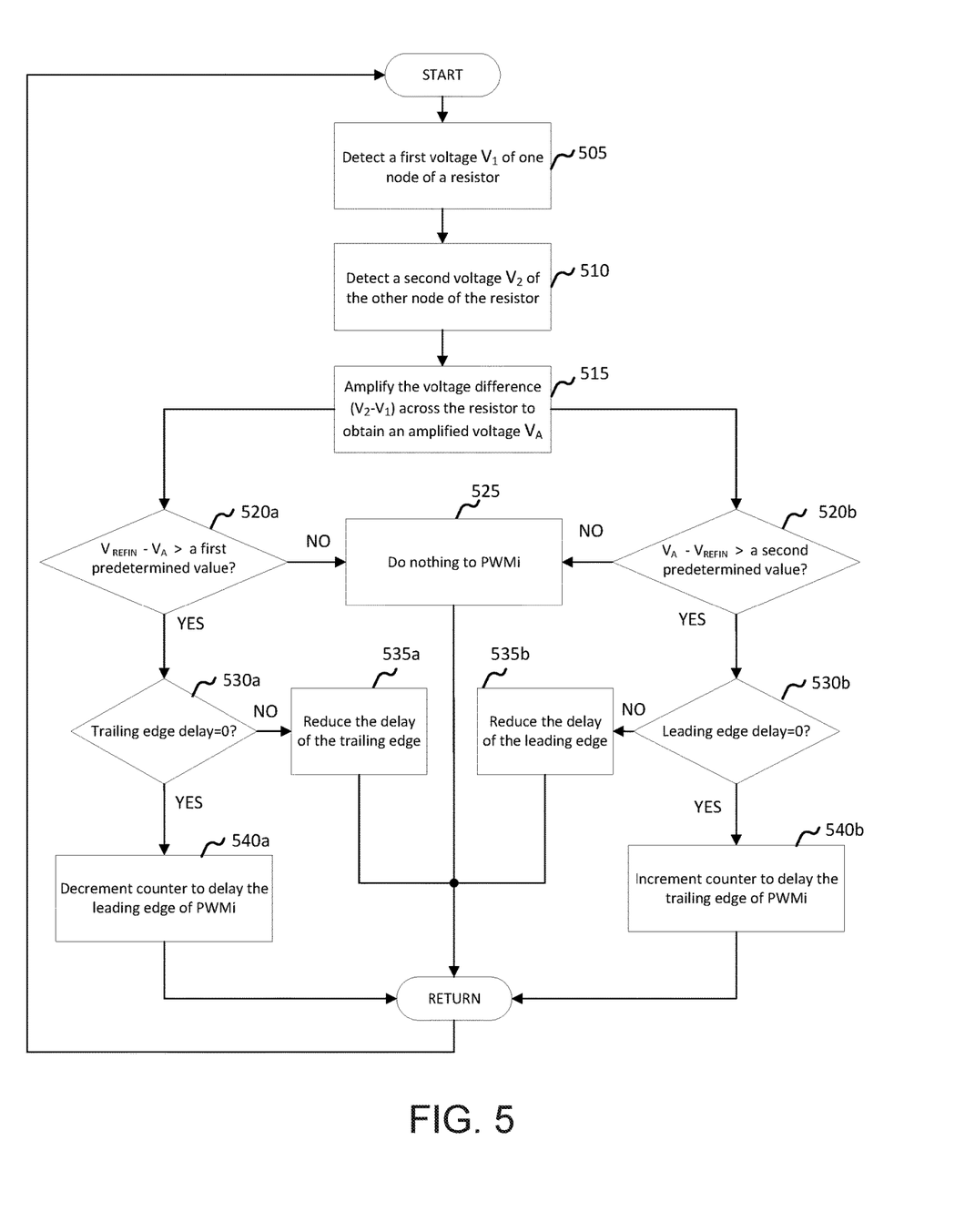
FIG. 5 depicts a flow chart of an exemplary method to adjust the duty cycle of a received PWM signal.

FIG. 5 depicts a flow chart of an exemplary method to adjust the duty cycle of a received PWM signal. A method includes, at 505, detecting a first voltage $V_1$ of a first electrical terminal (e.g., $a_1$) of a resistor (e.g., resistor Rs 340) that connected to a voltage source (e.g., voltage source 310). The method also includes, at 510, detecting a second voltage $V_2$ of the other electrical terminal (e.g., $a_2$) of the resistor 340.

The method also includes, at 515, amplifying the voltage difference (e.g., $V_2-V_1$) across the resistor 340. A differential amplifier (e.g., amplifier 350) may be used to amplify the voltage difference and generate an amplified voltage $V_A$. At 520a, a first difference between a reference voltage ($V_{REFIN}$) that supplied by an external source (e.g., PWM controller 125) and the amplified value $V_A$ is calculated by a first comparator (e.g., the first comparator 360a). At 520b, a second difference between the amplified value $V_A$ and the reference voltage ($V_{REFIN}$) is calculated by a second comparator (e.g., the second comparator 360b). If the first difference or the second difference is less than a corresponding predetermined value (e.g., dead zone value of the first comparator and/or the second comparator), then the pulse width of $PWM_i$ may not be adjusted.

If the first difference is larger than a corresponding first predetermined value, then, at 530a, whether a trailing edge delay equals 0 is determined. If the trailing edge delay doesn't equal 0, then, at 535a, a delay circuit (e.g., the delay circuit 380) will reduce the delay of the trailing edge until the trailing edge delay equals 0. In some embodiments, the trailing edge delay may be reset to 0 by other means. At 540a, a counter (e.g., the up/down counter 370) may be decremented and the delay circuit (e.g., the delay circuit 380) will delay the leading edge of $PWM_i$.

If the second difference is larger than a corresponding second predetermined value, then, at 530b, whether a leading edge delay equals 0 is determined. If the leading edge delay doesn't equal 0, then, at 535b, the delay circuit (e.g., the delay circuit 380) will reduce the delay of the leading edge until the leading edge delay equals 0. In some embodiments, the leading edge delay may be reset to 0 by other means. Then, at 540b, the counter (e.g., the up/down counter 370) may be incremented and the delay circuit (e.g., the delay circuit 380) will delay the leading edge of $PWM_i$. Thus, the PWM signal $PWM_i$ may be adjusted inside a smart power stage $SPS_i$ to make a phase current $IMON_i$ substantially equal the average current (e.g., IMON/N).

In some embodiments, the first predetermined value may be equal to the second predetermined value. In some embodiments, only one comparator may be used to determine the relationship between the amplified value $V_A$ and the reference voltage $V_{REFIN}$. For example, a comparator may determine the difference between the reference voltage $V_{REFIN}$ and the amplified value $V_A$. If the difference is positive and above the first determined value, then the counter and the delay circuit may delay the leading edge of $PWM_1$. And, if the difference is negative and below the second determined value, then the counter and the delay circuit may delay the trailing edge of $PWM_i$. In some embodiments, a state machine (e.g., implemented in hardware, software, or a combination thereof) may be designed to adjust the edges of $PWM_i$.

Although various embodiments have been described with reference to the figures, other embodiments are possible. For example, some embodiments may use DCR current sense or resistor sense methods to replace the $IMON_i$ signal. In some implementations, the IMON signals may be generated by a current source from each SPS. In various examples, DCR with parallel RC network(s) may be used to approximate current through inductor. In some embodiments, one or more analog-to-digital converters (ADC) may be arranged between the amplifier 350 and the comparators 360a/360b to convert the amplified signal into a digital signal. The comparators may compare differences between the digital signal and a reference signal to generate control signals for the counter 370 and the delay circuit 380, for example, to introduce a predetermined delay on the $PWM_i$ signal.

Although up/down counter was described with reference to FIG. 3B, other implementations may employ other techniques to controllably adjust the delay to effect current balance among the phase currents. Some embodiments may implement a controlled delay using, for example, voltage sensitive varactors or switched capacitor network to form, for example, a programmable delay line. Some embodiments may implement an adjustable delay using a ramp/threshold comparison circuit, for example.

In some embodiments, the resistor Rs in FIG. 3B may be an off-chip resistor, which may advantageously permit adjustment of sensitivity or gain, for example, by component level parameter selection. In some embodiments, the resistor Rs may be an on-chip resistor, which may be integrated into the SPS IC, without the need to access any additional pins. In some embodiments, the resistor Rs may be a variable resistor (e.g., on-chip or off-chip) such that the resistance may be adjusted. In some embodiments, the resistor Rs may include an array of a number of switched sub-resistors to obtain different resistance values. In some embodiments, the resistor Rs may be replaced by a combination of one or more fixed resistors and one or more variable resistors that may be arranged in parallel and/or series to achieve adjustable resistance values.

In some embodiments, the DME may receive a reference voltage $V_{REFIN}$ through a $REFIN_i$ pin from the PWM controller. In other implementations, the DME may receive a reference voltage from an internal reference voltage source embedded in the IC of the $SPS_i$. In some implementations, a detection circuit in one of the stages (SPS) may determine a sign and/or magnitude of a difference between the stage phase current and an average of phase currents in all stages. By way of example and not limitation, the determination about how to adjust the duty cycle (e.g., whether leading or trailing edge delay is minimal or zero) may be based on duty cycle delay adjustment parameters in place at the time of the determination or based on a prior duty cycle determination (e.g., an immediately adjacent or moving average of M prior delay values). Based on the sign of the determined difference, the DME may increase or decrease that stages duty cycle to increase or decrease, respectively, the average current for that stage. In some implementations, the duty cycle may adjust incrementally, or may adjust with a step size, for example, in proportion to an amplitude of the difference between the phase and the overall average signals. Accordingly, all stages may independently, simultaneously, continuously and automatically seek to substantially regulate, in real time, their corresponding output currents based on a share of an average of the total output current, thus achieving continuous time current balance and sharing benefits.

Although the DME processing circuit is described in terms of the comparators 360a, 360b and/or the up/down counter 370 with reference to FIG. 3B, other implementations are possible. For example, any of the steps of the method described with reference to FIG. 5 may be performed, for example, by an analog to digital converter in combination with a digital state machine configured to compare and process the sampled digitized values (e.g., V1, V2). In some embodiments, the state machine may be implemented using digital circuitry, alone or in combination with a processor executing a program of instructions. In some implementations, the state machine may, for example, be implemented using digital hardware circuits (e.g., FPGA, ASIC). Further, some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs), In some embodiments, the module(s) may involve execution of preprogrammed instructions and/or software executed by a processor. For example, various modules may involve both hardware and software.

In one exemplary aspect, a power converter system includes a plurality of N power stages operably interleaved with their respective output signals coupled to supply their respective output currents to a common output node, each power stage of the plurality of N power stages being adapted to receive a corresponding pulse width modulation signal. Each power stage of the plurality of power stages includes a delay modulation engine that includes (1) a first input node coupled to receive a first signal representative of an output current signal of the corresponding power stage, (2) a second input node coupled to receive a second signal representative of an average of the N output currents, (3) a detection circuit coupled to the first input node and to the second input node and configured to determine a difference between the first signal and the second signal, and, (4) a processing circuit coupled to receive a signal representative of the difference from the detection circuit, and further configured to generate the respective output signal by applying a delay to an edge of the corresponding pulse width modulation signal.

In some embodiments, the detection circuit may also include a resistance Rs coupled between the first input node and the second input node. In some embodiments, the detection circuit may determine a sign of the difference between the first signal and the second signal. In some embodiments, the applied delay may be a function of the sign of the difference between the first signal and the second signal. In some embodiments, the detection circuit may also include a comparison circuit configured to determine whether a magnitude of the difference between the first signal and the second signal is within a predetermined threshold.

In some embodiments, the detection circuit may include a current mirror circuit that replicates the current flowing between the first input node and the second input node. The mirrored current may be used to indicate both the direction and magnitude of the current flow between the first input node and the second input node.

In some embodiments, if the first signal exceeds the second signal by more than a first predetermined threshold, the processing circuit may be further configured to: (a) increase a leading edge delay of the generated output signal if a trailing edge delay of the generated output signal in an adjacent prior period of the $PWM_i'$ is at a minimum value, and (b) reduce the trailing edge delay of the generated output signal if a trailing edge delay of the generated output signal in an adjacent prior period of the $PWM_i'$ is not at a minimum value.

In some embodiments, if the second signal exceeds the first signal by more than a second predetermined threshold, then the processing circuit may be further configured to: (a) increase a trailing edge delay of the generated output signal if a leading edge delay of the generated output signal in an adjacent prior period of the $PWM_i'$ is at a minimum value, and, (b) reduce the leading edge delay of the generated output signal if a leading edge delay of the generated output signal in an adjacent prior period of the $PWM_i'$ is not at a minimum value.

In some embodiments, the plurality of N power stages may be operably interleaved with their respective output signals coupled to supply their respective output currents to a common output node through an output circuit that comprises at least one inductive element. In some embodiments, the power converter system may also include an integrated circuit (IC) package, and the DME may be formed within the IC package. In some embodiments, the detection circuit may also include an amplifier circuit coupled to receive the first signal and the second signal and to amplify a difference between the first signal and the second signal. In some embodiments, the amplifier may include an analog-to-digital conversion (ADC) circuit, and the detection circuit may also include a state machine coupled to receive an output signal from the ADC, wherein the state machine is further configured to determine an amplitude of the difference between the first signal and the second signal. In some embodiments, the applied delay may be also a function of the determined amplitude of the difference between the first signal and the second signal.

In another exemplary aspect, a delay modulation engine circuit includes a delay modulation engine operable to be disposed in each of a plurality of N power stages operably interleaved with their respective output signals coupled to supply their respective output currents to a common output node. Each power stage of the plurality of N power stages is adapted to receive a corresponding pulse width modulation signal. The DME includes (1) a first input node ($a_1$) coupled to receive a first signal representative of an output current signal of the corresponding power stage, (2) a second input node ($a_2$) coupled to receive a second signal representative of an average of the N output currents, (3) a detection circuit coupled to the first input node and to the second input node and configured to determine a sign of a difference between the first signal and the second signal, and, (4) a processing circuit coupled to receive a signal representative of the determined sign of the difference from the detection circuit, and further configured to generate the respective output signal by applying a delay to an edge of the corresponding pulse width modulation signal. The applied delay is a function of the determined sign of the difference.

In some embodiments, the detection circuit may also include a resistance Rs coupled between the first input node and the second input node. In some embodiments, the detection circuit may also include a comparison circuit configured to determine whether a magnitude of the difference between the first signal and the second signal is within a predetermined threshold. In some embodiments, if the first signal exceeds the second signal by more than a first predetermined threshold, the processing circuit may also be configured to: (a) increase a leading edge delay of the generated output signal if a trailing edge delay of the generated output signal in an adjacent prior period of the $PWM_i'$ is at a minimum value, and, (b) reduce the trailing edge delay of the generated output signal if a trailing edge delay of the generated output signal in an adjacent prior period of the $PWM_i'$ is not at a minimum value.

In some embodiments, if the second signal exceeds the first signal by more than a second predetermined threshold, the processing circuit may also be configured to: (a) increase a trailing edge delay of the generated output signal if a leading edge delay of the generated output signal in an adjacent prior period of the $PWM_i'$ is at a minimum value, and (b), reduce the leading edge delay of the generated output signal if a leading edge delay of the generated output signal in an adjacent prior period of the $PWM_i'$ is not at a minimum value. In some embodiments, each of the plurality of N power stages may be operably interleaved with their respective output signals coupled to supply their respective output currents to a common output node through an output circuit that comprises at least one inductive element.

In some embodiments, the circuit may also include an integrated circuit (IC) package, and the DME may be formed within the IC package. In some embodiments, the detection circuit may also include an amplifier circuit coupled to receive the first signal and the second signal and to amplify a difference between the first signal and the second signal. In some embodiments, the amplifier may also include an analog-to-digital conversion (ADC) circuit, and the detection circuit may also include a state machine coupled to receive an output signal from the ADC, the state machine may be configured to determine an amplitude of the difference between the first signal and the second signal. In some embodiments, the applied delay may be also a function of the determined amplitude of the difference between the first signal and the second signal.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A power converter system comprising:
a plurality of N power stages operably interleaved with their respective output signals coupled to supply their respective output currents to a common output node, each power stage of the plurality of N power stages being adapted to receive a corresponding pulse width modulation signal, wherein each power stage of the plurality of power stages comprises a delay modulation engine (DME) that comprises:
a first input node coupled to receive a first signal representative of an output current signal of the corresponding power stage;
a second input node coupled to receive a second signal representative of an average of the N output currents;
a detection circuit coupled to the first input node and to the second input node and configured to determine a difference between the first signal and the second signal; and,
a processing circuit coupled to receive a signal representative of the difference from the detection circuit, and further configured to generate the respective output signal by applying a delay to an edge of the received corresponding pulse width modulation signal.

2. The power converter system of claim 1, wherein the detection circuit further comprises a resistance coupled between the first input node and the second input node.

3. The power converter system of claim 1, wherein the detection circuit determines a sign of the difference between the first signal and the second signal.

4. The power converter system of claim 3, wherein the applied delay is a function of the sign of the difference between the first signal and the second signal.

5. The power converter system of claim 4, wherein the detection circuit further comprises a comparison circuit configured to determine whether a magnitude of the difference between the first signal and the second signal is within a predetermined threshold.

6. The power converter system of claim 4, wherein if the first signal exceeds the second signal by more than a first predetermined threshold, then the processing circuit is further configured to:
if a trailing edge delay of the generated output signal in an adjacent prior period of the generated output signal is at a minimum value, then increase a leading edge delay of the generated output signal; and,
if a trailing edge delay of the generated output signal in an adjacent prior period of the generated output signal is not at a minimum value, then reduce the trailing edge delay of the generated output signal.

7. The power converter system of claim 4, wherein if the second signal exceeds the first signal by more than a second predetermined threshold, then the processing circuit is further configured to:
if a leading edge delay of the generated output signal in an adjacent prior period of the generated output signal is at a minimum value, then increase a trailing edge delay of the generated output signal; and,
if a leading edge delay of the generated output signal in an adjacent prior period of the generated output signal is not at a minimum value, then reduce the leading edge delay of the generated output signal.

8. The power converter system of claim 1, wherein the detection circuit further comprises an amplifier circuit coupled to receive the first signal and the second signal and to amplify a difference between the first signal and the second signal.

9. The power converter system of claim 8, wherein the amplifier further comprises an analog-to-digital conversion (ADC) circuit, wherein the detection circuit further comprises a state machine coupled to receive an output signal from the ADC, wherein the state machine is further configured to determine an amplitude of the difference between the first signal and the second signal.

10. The power converter system of claim 9, wherein the applied delay is a further a function of the determined amplitude of the difference between the first signal and the second signal.

11. The power converter system of claim 1, wherein the plurality of N power stages are operably interleaved with their respective output signals coupled to supply their respective output currents to a common output node through an output circuit that comprises at least one inductive element.

12. The power converter system of claim 1, further comprising an integrated circuit (IC) package, wherein the DME is formed within the IC package.

13. A delay modulation engine (DME) circuit, the circuit comprising:
a Delay Modulation Engine (DME) operable to be disposed in each of a plurality of N power stages operably interleaved with their respective output signals coupled to supply their respective output currents to a common output node, each power stage of the plurality of N power stages being adapted to receive a corresponding pulse width modulation signal, wherein the DME comprises:
a first input node coupled to receive a first signal representative of an output current signal of the corresponding power stage;
a second input node coupled to receive a second signal representative of an average of the N output currents;
a detection circuit coupled to the first input node and to the second input node and configured to determine a sign of a difference between the first signal and the second signal; and,
a processing circuit coupled to receive a signal representative of the determined sign of the difference from the detection circuit, and further configured to generate the respective output signal by applying a delay to an edge of the received corresponding pulse width modulation signal, wherein the applied delay is a function of the determined sign of the difference.

14. The DME circuit of claim 13, wherein the detection circuit further comprises a resistance coupled between the first input node and the second input node.

15. The DME circuit of claim 13, wherein the detection circuit further comprises a comparison circuit configured to determine whether a magnitude of the difference between the first signal and the second signal is within a predetermined threshold.

16. The DME circuit of claim 13, wherein if the first signal exceeds the second signal by more than a first predetermined threshold, then the processing circuit is further configured to:
 if a trailing edge delay of the generated output signal in an adjacent prior period of the generated output signal is at a minimum value, then increase a leading edge delay of the generated output signal; and,
 if a trailing edge delay of the generated output signal in an adjacent prior period of the generated output signal is not at a minimum value, then reduce the trailing edge delay of the generated output signal.

17. The DME circuit of claim 13, wherein if the second signal exceeds the first signal by more than a second predetermined threshold, then the processing circuit is further configured to:
 if a leading edge delay of the generated output signal in an adjacent prior period of the generated output signal is at a minimum value, then increase a trailing edge delay of the generated output signal; and,
 if a leading edge delay of the generated output signal in an adjacent prior period of the generated output signal is not at a minimum value, then reduce the leading edge delay of the generated output signal.

18. The DME circuit of claim 13, wherein each of the plurality of N power stages are operably interleaved with their respective output signals coupled to supply their respective output currents to a common output node through an output circuit that comprises at least one inductive element.

19. The DME circuit of claim 13, further comprising an integrated circuit (IC) package, wherein the DME is formed within the IC package.

20. The DME circuit of claim 13, wherein the detection circuit further comprises an amplifier circuit coupled to receive the first signal and the second signal and to amplify a difference between the first signal and the second signal.

21. The DME circuit of claim 20, wherein the amplifier further comprises an analog-to-digital conversion (ADC) circuit, wherein the detection circuit further comprises a state machine coupled to receive an output signal from the ADC, wherein the state machine is further configured to determine an amplitude of the difference between the first signal and the second signal.

22. The DME circuit of claim 21, wherein the applied delay is a further a function of the determined amplitude of the difference between the first signal and the second signal.

* * * * *